May 16, 1939. J. R. CAMPBELL 2,158,850
TEMPERATURE CONTROL DEVICE
Filed Nov. 30, 1937
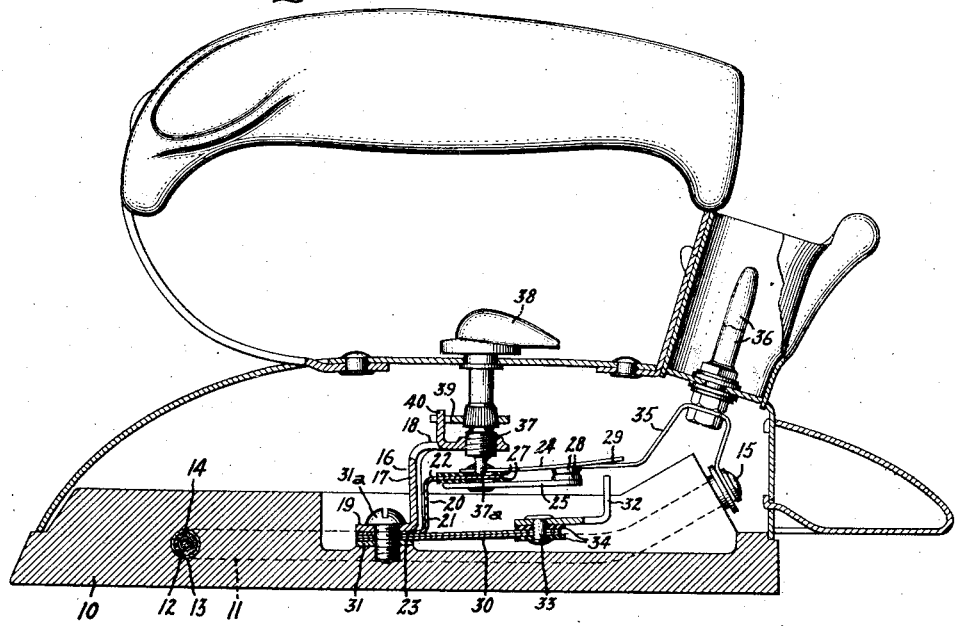
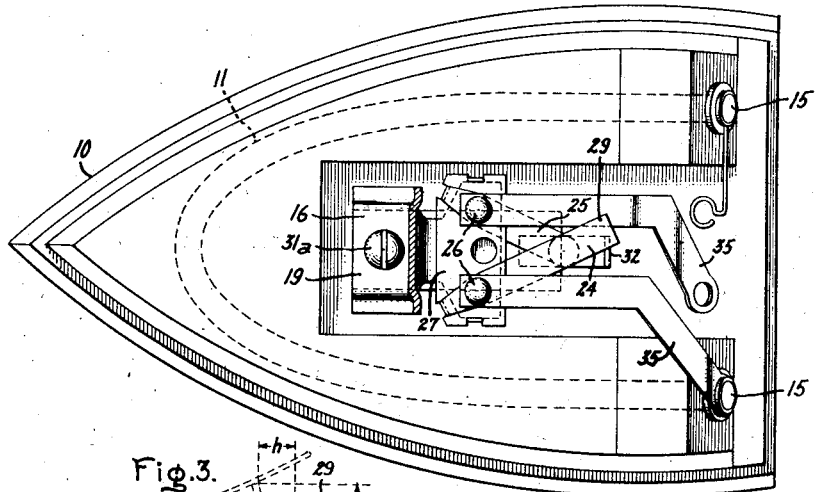
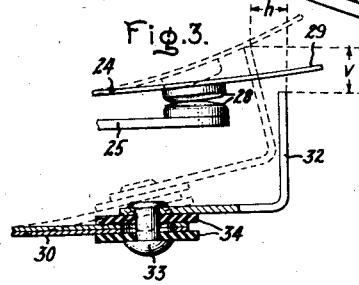
Inventor:
James R. Campbell,
by Harry E. Dunbar
His Attorney.

Patented May 16, 1939

2,158,850

UNITED STATES PATENT OFFICE 2,158,850

TEMPERATURE CONTROL DEVICE

James R. Campbell, Ontario, Calif., assignor to General Electric Company, a corporation of New York Application November 30, 1937, Serial No. 177,263

5 Claims. (Cl. 200—138)

This invention relates to temperature control devices, more particularly to temperature control devices for controlling an electric circuit, such as a heating circuit, in response to changes in temperature, and it has for its object the provision of a simple, reliable and efficient device of this character, and further, one which is quite inexpensive to make.

This invention relates to temperature control devices of the type described and claimed in the copending application of Chester I. Hall and Claude M. Hathaway, Serial No. 177,264, filed Nov. 30, 1937. As there shown, this temperature control device comprises a bimetallic element that operates responsively to changes in temperature to engage a switch arm to move it between its switch opening and closing positions, and as it moves the switch arm to have a sliding frictional engagement with it. This frictional engagement both eliminates chattering of the contacts, and also causes the switch arm to move to its opened and closed positions with a slight snap action.

In accordance with this invention, the bimetallic bar carries a member arranged at a material angle to it and arranged to apply a lateral pressure to a switch arm to control its movement. As the angle member applies this lateral pressure, it also moves longitudinally relative to the switch arm so that a sliding frictional force is generated between these members. The static frictional force between these members temporarily arrests relative movement between them so that when the stored up force in the bimetallic bar overcomes this friction, the switch arm is moved quickly. The sliding frictional forces generated as the switch arm is moved prevents "reed" action in the bimetallic bar and switch arm, and also eliminates chattering of the contacts.

In addition, the switch arm cooperates with a second switch arm. The two switch arms are mounted on a resilient member, the position of which is controlled by an adjusting knob. When the knob is turned to adjust the positions of the switch arms, the temperature setting of the control device is varied.

For a more complete understanding of this invention, reference should be had to the accompanying drawing in which Fig. 1 is an elevation mainly in section of an electrically heated flatiron provided with a temperature control device arranged in accordance with this invention; Fig. 2 is a plan view of the flatiron of Fig. 1; and Fig. 3 is a fragmentary elevation of a part of the temperature control device of the iron of Figs. 1 and 2.

Referring to the drawing, this invention has been shown in one form as applied to an electrically heated flatiron having a sole plate 10 that is formed of any suitable material, such as cast iron or aluminum. Cast within the sole plate 10 is a sheathed heating element 11, preferably of the type described and claimed in the United States patent to C. C. Abbott No. 1,367,341, dated February 1, 1921. As shown, this heating element comprises a helical resistance element 12 mounted in a tubular metallic sheath 13 and supported in spaced relation with reference to the sheath by a compacted layer of insulating material 14 which preferably will be powdered magnesium oxide. Heating elements of this type can be easily bent into desired shapes, and as shown, the heating element 11 is formed roughly in the shape of a horseshoe having its terminals 15 at the heel end of the iron and its apex or bend at the toe end of the iron.

The temperature control device arranged in accordance with this invention comprises a bracket 16 having a straight body portion 17 and two end portions 18 and 19 projecting from the body portion in opposite directions, as shown. These end portions also preferably will be straight, and preferably will be arranged in substantially parallel relation with each other; this arrangement, however, is not necessary as the members 18 and 19 may be arranged at different angles to the body part 17. The control device further comprises a similarly shaped support 20 having a body portion 21 and the end portions 22 and 23, and formed of a suitable spring material. This member 20, as shown, is nested—so to speak—with the bracket 16, and has its end 23 corresponding to the end 19 rigidly secured to it in any suitable manner, as by welding. Its other end 22 is positioned below and spaced somewhat from the corresponding end 18.

This end portion 22 supports a pair of elongated switch arms 24 and 25 spaced from each other one above the other. The arms 24 and 25 have their left-hand ends, as viewed in Fig. 1, rigidly secured to opposite sides of the end portion 22 of the spring arm 20. They may be secured to the end 22 in any suitable manner, as by means of rivets 26, and each is insulated from the end 22 by a sheet of insulation 27 formed of any suitable insulating material, such as mica. The opposite ends of the arms are free to move and carry cooperating switch contacts 28. The lower arm 25 preferably will be rigid, whereas the upper arm 24 is formed of a spring material and hence is resilient. The resiliency of this arm is such that it biases the contact 28 carried thereon into engagement with the contact 28 carried by the arm 25.

The resilient switch arm 24 has its one end 29 projecting beyond the position of the contacts 28, and cooperating with this projecting end is a temperature responsive element 30. The temperature responsive element 30 comprises an elongated bimetallic bar, as shown, formed of two metals having dissimilar temperature coefficients of expansion, such as Invar and steel, rigidly secured together lengthwise, as by welding. The left-hand end of the bar, as viewed in Fig. 1 is rigidly secured to the arm 19 of the support 16 below the arm 23 for the support 20, and is secured thereto by welding or in any other suitable manner. Positioned below the bimetallic bar is a clamping plate 31 also secured to the assembly by welding or other suitable means. The bracket with the switch arms, their support 20, the bimetallic bar 30 and clamping plate 31 assembled with it is rigidly secured to the sole plate 10 by a single clamping screw 31a. This screw is directed through apertures provided for it in the arm 19 of the bracket, the arm 23 of the support 20, the fixed end of the bimetallic bar, and the clamping plate 31, and it is received in threaded engagement with the sole plate, as shown.

The end of the bimetallic bar opposite its fixed end is free to move responsively to temperature changes and this end carries a bracket 32 which, in the form of the invention illustrated, is of right angle shape but which may have any suitable angular form. One arm of the bracket constitutes an extension of the bimetallic bar and is rigidly secured to the free end of the bimetal bar in any suitable manner, as by rivets 33, only one of which is shown; the rivets and the bracket 32 are electrically insulated from the bimetal bar by mica sheets 34. The other arm of the bracket 32 extends upwardly to engage the under surface of the extension 29 on the spring arm 24.

It will be understood that when the temperature of the bar 30 is elevated, it tends to curve upwardly to move its free end upwardly toward its dotted line position shown in Fig. 3, and when it is so moved it moves the bracket 32 upwardly to elevate the end 29 and thus separate the switch contacts 28. When the bracket 32 thus moves upwardly, for example, through the distance $v$, the upper edge of the bracket will move laterally along the arm through the distance $h$. Conversely, when the temperature of the bimetal bar 30 is reduced, the bar moves the bracket 32 downwardly to permit the switch arm to close and in so moving it returns to its initial position shown in full lines in Fig. 1. Due to the frictional engagement between the bracket 32 and the switch arm 24, the switch contacts 28 are opened with a slight snap action. This is because the static friction between the bracket and the switch arm is greater than the sliding friction due to the sliding movement $h$, and hence, when the force applied by the bimetal bar 30 has increased sufficiently to overcome the static friction, the bimetallic bar, once movement has started, will quickly move to open the contacts 28 due to the decreasing sliding frictional force. The bar 30, it will be observed is spaced a material distance from the switch arm so that a relatively large longitudinal movement $h$ is provided for a given upward movement $v$. This distance $h$ is amplified by the curving of the bimetal bar upwardly while being heated; as it curves upwardly it moves its free end toward the left to increase distance $h$. The sliding friction generated during movement $h$ eliminates "reed" action in the bimetal bar and in the switch arm 24, and eliminates chattering of contacts 28. If desired, and in some cases it is preferable, the upper edge of the bracket arm 32 bearing on the extension 29 may be tapered downwardly to reduce the area of contact with the extension.

The switch arms 24 and 25 are electrically connected in the circuit to be controlled by means of leads 35, which as shown are rigidly secured in electrical relation with the two switch arms respectively by means of the rivets 26. One of these leads is electrically connected with one terminal 15 of the heating element 11, while the other is connected with one of the terminal pins 36 of the iron. The opposite terminal pin 36 is connected with the other terminal 15 of the heating element.

The temperature adjustment of the control device is effected by means of an adjusting screw 37 mounted in the arm 18, as clearly shown in Fig. 1. This arm at its lower end carries a button 37a that bears upon the arm 22 of the switch support 20, the upper mica sheet having an aperture permitting the button to do this. The resiliency of the support 20 is such that it biases the arm 22 upwardly against the button. Consequently, when the screw is adjusted, the position of the support, and hence, the positions of the switch arms 24 and 25 are adjusted. As the positions of these arms are adjusted relatively to the temperature responsive bar 30, the temperature setting of the device is changed. Thus, if the positions of the switch arms be adjusted downwardly, the temperature setting is lowered, whereas if they be moved upwardly the temperature setting is increased.

The adjusting screw 37 extends upwardly through the cover of the iron where an adjusting knob 38 is secured to the rod. It also carries under the cover a stop member 39 that engages a stop 40 at the opposite limits of adjusting movement of the screw. It will be clear that the adjusting screw can be operated to flex the support 22 downwardly sufficiently far to cause the rigid arm 25 to move from the flexible arm 24 after the latter has engaged the member 32 to thereby open the switch contacts.

It will be understood that in the operation of the iron, the temperature responsive bar 30 is supported in direct thermal relation to the base through the supporting bracket 16 and the clamping plate 31, the bar lying directly above the sole plate to respond to its fluctuations in temperature. When the temperature of the sole plate attains a predetermined maximum, depending upon the setting of the control knob 38, the temperature responsive element 30 moves upwardly to open the switch contacts 28, and thereby cut off the heat, whereas when the temperature falls to a predetermined minimum, the temperature responsive bar is lowered to reapply the heat. As previously pointed out, temperature adjustment is effected by setting the knob 38.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device comprising an elongated resilient switch arm biased to a predetermined controlling position, a relatively shorter bimetallic temperature responsive bar in spaced relation with said switch arm having one end free to move in response to temperature changes, a member having two arms arranged at a material angle to each other, one arm secured to said free end of said bimetallic bar and constituting an extension of said bar, and the other arm extending toward said switch arm and having its end arranged to engage it when the bar moves to control the movement of the switch arm, the switch arm and bimetallic bar being positioned and spaced from each other so that said end of said other arm moves a material distance longitudinally of said switch arm as the switch arm is moved to open and close the switch.

2. A temperature control device comprising a pair of spaced switch arms having free ends that carry cooperating switch contacts, one of said arms being substantially rigid, and the other resilient so that it can be moved with reference to said one arm and said resilient arm having an end portion extending beyond said contacts, a resilient support secured to the ends of said switch arms opposite said free ends, a base supporting said resilient support, a bimetallic temperature responsive bar secured to said base, a member on said bar arranged to laterally and slidably engage said extending end of said switch arm to move it to open and close said contacts responsively to temperature changes, and an adjusting member on said base arranged to engage said resilient support to vary the positions of said switch arms.

3. A temperature control device comprising a substantially rigid bracket having a substantially straight body portion and two substantially straight end portions extending from the ends of said body portion in opposite directions, a similarly shaped resilient support having one of its end portions rigidly secured to the corresponding end portion of said bracket, and its other end portion spaced from the corresponding end portion of said bracket and free to move, a pair of spaced switch arms secured to said other end portion of said support, one being resilient and free to move relative to the other and the other being substantially rigid, a screw mounted in the end portion of said bracket corresponding to the free end portion of said resilient support and arranged to bear on said resilient support and adjustable to vary the positions of said switch arms, a bimetallic temperature responsive bar having one end rigidly secured to the end portion of said bracket to which said resilient support is secured, and having its other end free to move responsively to temperature changes, and an arm supported on said free end of said bar and extending laterally therefrom to laterally and frictionally engage said resilient switch arm to move it with respect to said rigid switch arm in response to temperature changes.

4. A temperature control device comprising a pair of spaced switch arms having free ends that carry cooperating switch contacts, one of said arms being substantially rigid, and the other resilient so that it can be moved with reference to said one arm, a thermostatic member engaging said resilient switch arm to move it with reference to the rigid switch arm, a flexible support for said rigid and resilient arms, means securing the ends of said arms opposite said contacts to said support, and means for flexing said support to vary the positions of said switch arms with reference to said thermostatic member.

5. A temperature control device comprising spaced switch arms having free ends that carry cooperating switch contacts, one arm being rigid and the other resilient, the latter arm having a portion extending beyond said contacts, a bimetallic bar spaced from said arms and positioned so that the rigid arm lies between the bimetallic bar and the resilient switch arm, a member carried by said bimetallic bar engaging said extending portion to operate the resilient switch arm to open and close said contacts by movement of the bimetallic bar, a resilient support for said switch arms, and an adjusting member for flexing said support to vary the position of said switch arms and thereby that of said extending portion with relation to said member on said bimetallic bar to vary the temperature setting of said control device, and to move said extending portion into engagement with said member to separate said switch contacts.

JAMES R. CAMPBELL.